(12) United States Patent
Kato

(10) Patent No.: US 8,490,109 B2
(45) Date of Patent: Jul. 16, 2013

(54) PRINTING CONTROL APPARATUS, PRINTING CONTROL METHOD, AND COMPUTER-READABLE STORAGE MEDIUM STORING COMPUTER PROGRAM

(75) Inventor: Hisashi Kato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 967 days.

(21) Appl. No.: 12/372,951

(22) Filed: Feb. 18, 2009

(65) Prior Publication Data

US 2009/0217305 A1    Aug. 27, 2009

(30) Foreign Application Priority Data

Feb. 21, 2008   (JP) ................................. 2008-040479

(51) Int. Cl.
*G06F 3/00*        (2006.01)
*G06F 7/04*        (2006.01)

(52) U.S. Cl.
USPC .............................................. 719/310; 726/2

(58) Field of Classification Search
USPC ............................................. 719/310; 726/2
See application file for complete search history.

(56) References Cited

U.S. PATENT DOCUMENTS

2003/0005369 A1\* 1/2003 Trelewicz et al. ............... 714/44
2005/0183141 A1\* 8/2005 Sawada ........................... 726/16
2008/0052761 A1\* 2/2008 Minami ............................ 726/2

FOREIGN PATENT DOCUMENTS

JP     H10-207661 A     8/1998
JP     2001-067191 A    3/2001

OTHER PUBLICATIONS

Gregor Kiczales, An Overview or Aspectj, 2001.\*

\* cited by examiner

*Primary Examiner* — Lechi Truong
(74) *Attorney, Agent, or Firm* — Canon USA Inc IP Division

(57) ABSTRACT

A printing control apparatus includes a first obtaining unit configured to obtain management information that manages use of document data, a second obtaining unit configured to obtain attribute information relating to an attribute of management information obtained by the obtaining unit, an embedding unit configured to embed the management information obtained by the first obtaining unit and the attribute information obtained by the second obtaining unit in the document data, and an output unit configured to output the document data in which the management information and the attribute information are embedded by the embedding unit, to a printing apparatus.

6 Claims, 11 Drawing Sheets

FIG. 6

```
<DeptAccountInformation>  ←―501
  <DeptID>1234</DeptID>  ←―502
  <Pass>5678</Pass>  ←―503
  <CreatedTime>2007-01-19T06:44:22</CreatedTime>  ←―504
</DeptAccountInformation>
```
500

TERM INFORMATION:

```
CURRENT TIME INFORMATION:
2007-01-19T09:50:03
```

PRINTING CONTROL APPARATUS, PRINTING CONTROL METHOD, AND COMPUTER-READABLE STORAGE MEDIUM STORING COMPUTER PROGRAM

BACKGROUND OF THE INVENTION

1. Field of the Invention

The present invention relates to a printing control apparatus, a printing control method, and a computer-readable storage medium storing a computer program. More specifically, the invention is suitable to be used in printing document data in which management information for managing the use of the document data is embedded.

2. Description of the Related Art

The introduction of Microsoft Windows® Vista, which is an operating system (OS) manufactured by Microsoft Corporation, made drastic changes in printing systems. More specifically, a new printing system made based on an Extensible Markup Language (XML) Paper Specification (XPS) was introduced which keeps compatibility with a printing system made based on a Graphic Device Interface (GDI) (browse Print-Architecture and Driver Support [online] by Microsoft Corporation, [searched on Jan. 30, 2008]). XPS is one of electronic document formats. The XPS document is comprised of various parts such as an XML that stores information of a document structure, drawing information, and print settings and a binary resource such as a bit map and a font.

As is described in the above-referenced literature, the XPS document has two aspects. One is a spool format when the document is printed, and another is a normal document. When attention is drawn to the aspect of the document, the XPS document is used like a PDF file according to Adobe Systems Incorporated for the purpose of publication and/or distribution of various documents. Further, the XPS document containing a print attribute can be used as a format for a print job. After Windows® Vista was released, a printer device capable of directly printing out XPS documents arrives on the market. A typical method to print XPS documents using the printer device capable of directly printing XPS documents is to print the document by a conventional printer driver.

As is described above, XPS documents have the aspect of the document. Therefore, it is expected that printing is increasingly performed using a printing utility or the like in which the XPS document is directly transmitted to a printer device, without utilizing a printer driver. XPS documents are a generalized format. Therefore, when the printing utility is utilized, a function to change the layout of an XPS document and a function to provide color processing can be realized with ease. With such a printing utility, it becomes possible to store an XPS document in a file after the layout of the XPS document has been changed. Further, it may be possible that a prepared XPS document is shared in a Sharepoint Portal Server® produced by Microsoft Corporation, which allows a printer device to directly print out the XPS document existing on a server.

Further, in conventional print processing in an office, the number of sheets having been printed by the printer device is managed by each department (see Japanese Patent Application Laid-Open No. 10-207661). Accordingly, with the spread of XPS documents, it is expected that print management is performed for every department also under such a user environment that XPS documents will be directly printed out by printer devices.

In the conventional printing managed by respective department as is described in the above-referenced literature, a print job is carried out together with department management information such as a department ID and a password. When the XPS document is used as the format of the print job, the printing will be carried out, including the department management information within the XPS document that is job data.

In the case that the XPS document is output to a printer device using a printing utility without utilizing a printer driver, the department management information is embedded in the XPS document by the printing utility. When the XPS document is output in the form of a file using the printing utility having a department management function, it is possible that department management information may be contained in the XPS document.

If the XPS document containing the department management information thus generated is shared by a Sharepoint server or the like, the XPS document containing the department management information may be passed on to a third party, which can directly print out the document with the printer device. Alternatively, there is a problem that the number of printing sheets cannot be counted correctly for every department if the XPS document is printed out by the third party using other department management information unrelated to the third party.

SUMMARY OF THE INVENTION

The present invention is directed to prevent a third party from using document data, in which management information for managing the use of the document data is embedded, as much as possible.

According to an aspect of the present invention, a printing control apparatus includes a first obtaining unit configured to obtain management information that manages use of document data, a second obtaining unit configured to obtain attribute information relating to an attribute of the management information obtained by the first obtaining unit, an embedding unit configured to embed the management information obtained by the first obtaining unit and the attribute information obtained by the second obtaining unit, into the document data, and an output unit configured to output document data in which the management information and the attribute information are embedded by the embedding unit, to a printing apparatus.

According to another aspect of the present invention, a printing control apparatus includes an authentication unit configured to perform authentication based on department management information of a document when it is determined to be within a time limit based on information of the document, and to display a screen for entering authentication information and perform authentication based on entered authentication information when it is determined to be outside of a time limit based on information of the document, and an execution unit for executing printing of the document when the authentication by the authentication unit is successful.

According to yet another aspect of the present invention, a printing control apparatus includes an authentication unit configured to perform authentication based on department management information of a document when device information of the document matches device information of the printing control apparatus, and to display a screen for entering authentication information and perform authentication based on entered authentication information when the device information of the document fails to match the device information of the printing control apparatus, and an execution unit configured to execute printing of the document when the authentication by the authentication unit is successful.

According to another aspect of the present invention, a printing apparatus includes an input unit configured to enter document data in which management information for managing the use of the document data and attribute information relating to an attribute of the management information are embedded, from a printing control apparatus, a first obtaining unit configured to obtain the management information from the document data entered by the input unit, a second obtaining unit configured to obtain the attribute information from the document data entered by the input unit, a determination unit configured to determine whether the attribute information obtained by the second obtaining unit satisfies a predetermined condition, and a print execution unit configured to perform printing of the document data when it is determined by the determination unit that the attribute information obtained by the obtaining unit satisfies the predetermined condition.

According to yet another aspect of the present invention, a printing control method includes obtaining management information that manages use of document data, obtaining attribute information relating to an attribute of the obtained management information, embedding the obtained management information and the attribute information into the document data, and outputting the document data in which the management information and the attribute information are embedded, to a printing apparatus.

According to yet another aspect of the present invention, a printing control method includes entering document data in which management information for managing use of the document data and attribute information relating to an attribute of the management information are embedded, from the printing control apparatus, obtaining the management information from the entered document data, obtaining the attribute information from the entered document data, determining whether the thus obtained attribute information satisfies a predetermined condition, and executing printing of the document data when it is determined that the thus obtained attribute information satisfies the predetermined condition.

According to yet another aspect of the present invention, a printing control method includes performing authentication based on department management information of a document when it is determined to be within a time limit based on information of the document, and displaying a screen for entering authentication information and performing authentication based on entered authentication information when it is determined to be outside of a time limit based on information of the document and executing printing of the document when the authentication by the authentication unit is successful.

According to yet another aspect of the present invention, a printing control method includes performing authentication based on department management information of a document when device information of the document matches device information of a printing control apparatus, and displaying a screen for entering authentication information and performing authentication based on entered authentication information when the device information of the document fails to match the device information of the printing control apparatus, and executing printing of the document when the authentication by the authentication unit is successful.

According to yet another aspect of the present invention, a computer-readable storage medium which stores a computer program that causes a computer to execute operations comprising obtaining management information for managing use of document data, obtaining attribute information relating to an attribute of the obtained management information, embedding the obtained attribute information into the document data, and issuing an instruction to output the document data in which the management information and the attribute information are embedded, to a printing apparatus.

According to yet another aspect of the present invention, a computer-readable storage medium which stores a computer program that causes a computer to execute operations comprising obtaining management information from document data in which management information for managing use of the document data and attribution information relating to an attribute of the management information are embedded when the document data is entered from a printing control apparatus, obtaining the attribute information from the document data, determining whether the obtained attribute information satisfies a predetermined condition, and issuing an instruction to execute printing of the document data when it is determined that the obtained attribute information satisfies the predetermined condition.

According to yet another aspect of the present invention, a computer-readable storage medium which stores a computer program that causes a computer to execute operations comprising performing authentication based on department management information of a document when it is determined to be within a time limit based on the information of the document, and displaying a screen for entering authentication information and performing authentication based on entered authentication information when it is determined to be outside of the time limit based on the information of the document, and executing printing of the document when the authentication is successful.

According to yet another aspect of the present invention, a computer-readable storage medium which stores a computer program that causes a computer to execute operations comprising performing authentication based on department management information of a document when device information of the document matches device information of the computer, and displaying a screen for entering authentication information and performing authentication based on entered authentication information when the device information of the document fails to match the device information of the computer, and executing printing of the document when the authentication by the authentication unit is successful.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a view illustrating an example of the department management information stored in the XPS document in step S404 in FIG. 4 according to the first exemplary embodiment of the present invention.

FIG. 8 is a view illustrating an example of term information stored in a term information storing unit according to the first exemplary embodiment of the present invention.

FIG. 9 is a view illustrating an example of current time information stored in a time information storing unit according to the first exemplary embodiment of the present invention.

DETAILED DESCRIPTION OF THE EMBODIMENTS

Various exemplary embodiments, features, and aspects of the invention will be described in detail below with reference to the drawings.

Figure 1:
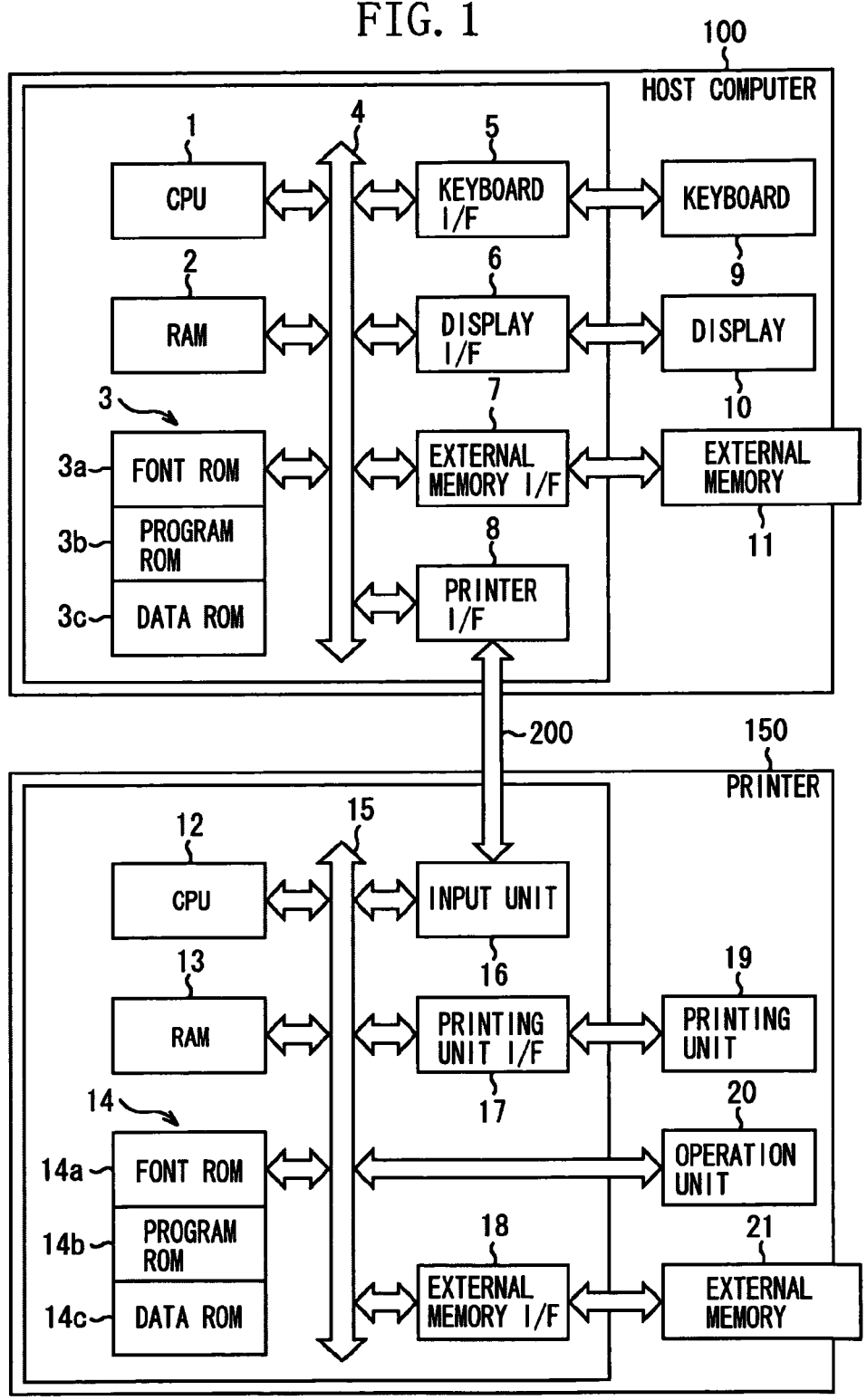
FIG. 1 is a block diagram illustrating an exemplary configuration of a printer control system according to a first exemplary embodiment of the present invention.

FIG. 1 is a block diagram illustrating an exemplary configuration of a printer control system according to a first exemplary embodiment of the present invention. Here, the printer control system is not limited to that of FIG. 1 as long as it can execute the below-described functions. In other words, the printer control system may be a single device, a system comprising a plurality of devices, or a system for executing processing by connection through a network such as a LAN and a WAN.

In FIG. 1, a host computer 100 includes a central processing unit (CPU) 1. The CPU 1 executes processing of a document composed of a mixture of drawings, images, characters, tables (including table calculation or the like), and the like based on a program stored in a program read-only memory (ROM) 3b of a ROM 3 or a document processing program stored in an external memory 11. Further, the CPU 1 controls as a whole the devices connected to a system bus 4.

The program ROM 3b of the ROM 3 or the external memory 11 stores an operating system program (hereinafter referred to as an "OS") which serves as a control program of the CPU 1. A font ROM 3a of the ROM 3 or the external memory 11 stores font data and the like to be used in processing a document. Further, a data ROM 3c of the ROM 3 or the external memory 11 stores various data to be used in processing a document.

A random access memory (RAM) 2 serves as a main memory, a work area, or the like for the CPU 1. A keyboard interface (I/F) 5 controls a key input from a keyboard 9 or a pointing device (not illustrated). A display I/F 6 controls display of a display 10, for example, a liquid crystal display. An external memory I/F 7 controls access to the external memory 11 which stores a boot program, various applications, font data, a user file, an edit file, a printer driver, or the like. The external memory 11 may be, for example, a hard disk (HD) or a flexible disk (FD).

A printer I/F 8 is connected to a printer 150 through a predetermined interactive interface 200 in order to execute a communication control with the printer 150. The CPU 1 executes a rasterization of an outline font to a display information RAM set, for example, in the RAM 2 to enable a What You See Is What You Get (WYSIWYG) of an image displayed on the display 10.

Further, the CPU 1 opens various windows based on a command instructed by a user using a mouse cursor (not illustrated) displayed on the display 10 to execute various data processing. When the user executes a printing, the user opens a window regarding a print setting to perform a setting of the printer or a setting of a print processing method including the selection of a print mode with regard to a printer driver.

The printer 150 includes a CPU 12. The CPU 12 outputs an image signal as output information to a printing unit 19 via printing unit I/F 17 connected to a system bus 15 based on a control program or the like stored in a program ROM 14b of a ROM 14 or a control program or the like stored in an external memory 21.

Further, the program ROM 14b of the ROM 14 stores a control program or the like of the CPU 12. A font ROM 14a of the ROM 14 stores font data or the like to be used in generating the output information. In a case of a printer without the external memory 21 such as a hard disk, a data ROM 14c of the ROM 14 also stores information or the like to be used by a host computer 100.

The CPU 12 can perform communication processing with the host computer 100 through an input unit 16 and notify information or the like in the printer 150 to the host computer 100. A RAM 13 functions as a main memory of the CPU 12, a work area, or the like, and memory capacity can be expanded by means of an optional RAM connected to an expansion port (not illustrated). The RAM 13 is used as an output information rasterization area, an environmental data storing area, a NVRAM, or the like. Access to an external memory 21 such as a hard disk (HD) or an IC card is controlled by an external memory I/F (memory controller) 18.

The external memory 21 is optionally connected to the printer 150 and stores font data, an emulation program, form data, or the like. Further, an operation unit 20 includes an operation panel, a switch enabling a user to operate the apparatus through the operation panel, a light emitting diode (LED) display device, or the like. The number of the external memory 21 is not limited to one. One or more than one external memories 21 may be connected to the printer 150. For example, an optional font card in addition to an internal font or a plurality of external memories 21, which store programs for interpreting printer control languages of different languages, may be connected to the printer 150. Further, the printer 150 includes a non-volatile random access memory (NVRAM) (not illustrated), which may store printer mode setting information or the like received from the operation panel (operation unit 20).

Figure 2:
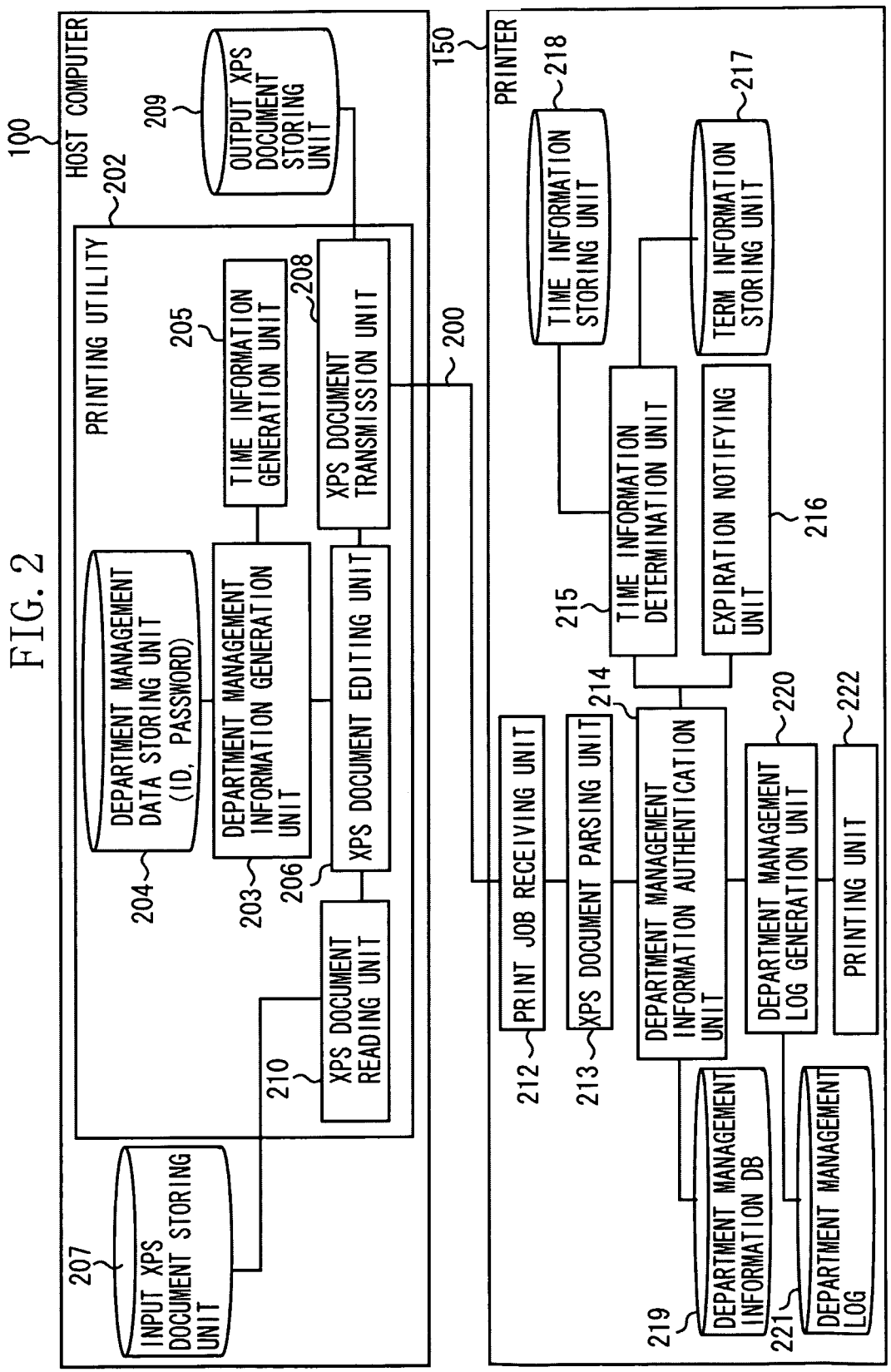
FIG. 2 is a block diagram illustrating an exemplary functional configuration of the printer control system according to the first exemplary embodiment of the present invention.

FIG. 2 is a block diagram illustrating an exemplary functional configuration of a printer control system. Further, FIG. 3 is a view illustrating an example of a UI screen displayed on the display 10 of the host computer 100 after a printing utility 202 is activated.

Figure 3:
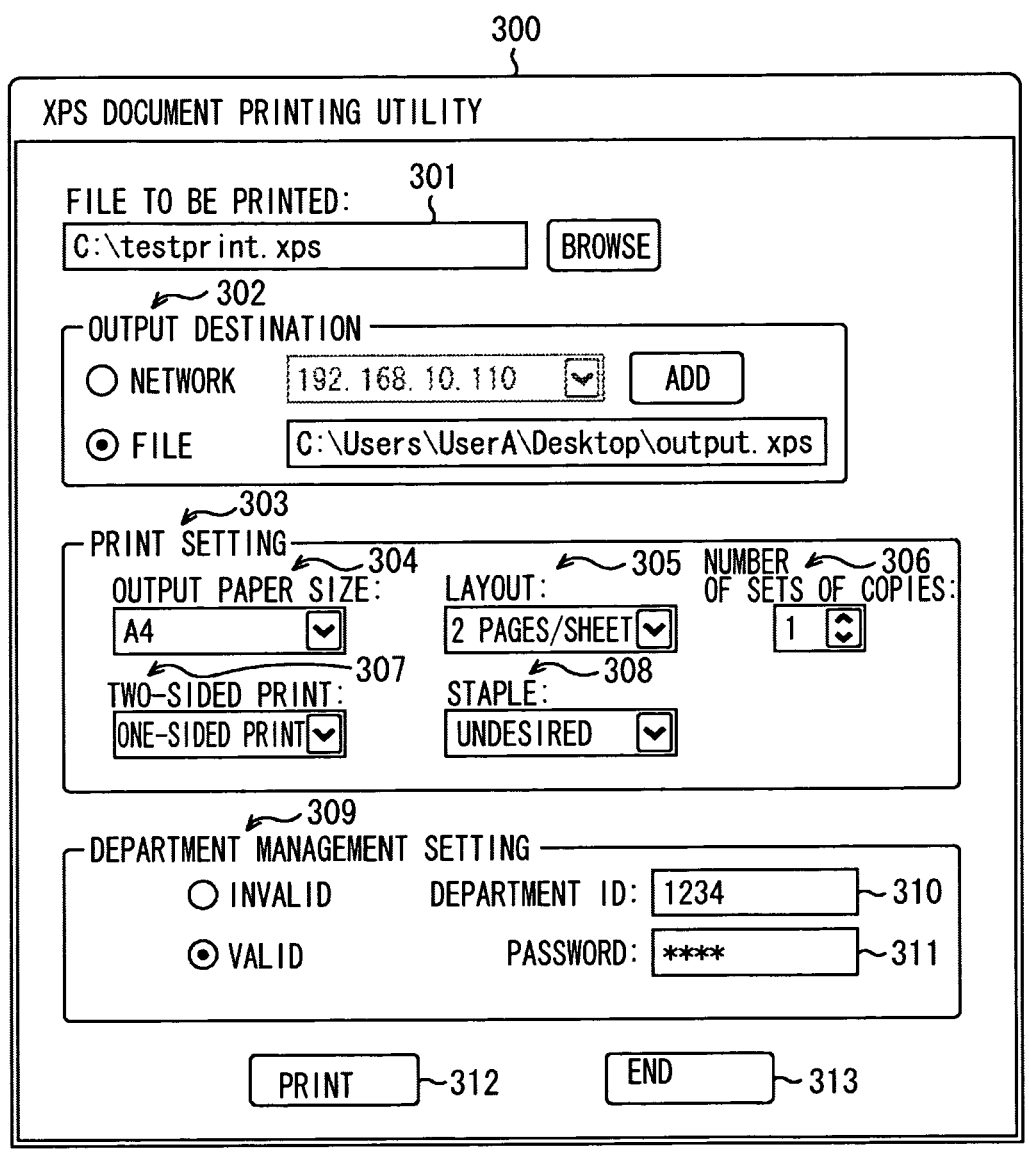
FIG. 3 is a view illustrating an example of a user interface (UI) screen displayed on a display of a host computer after the printing utility according to the first exemplary embodiment of the present invention is activated.

In FIG. 3, a user interface (UI) screen 300 displayed by the printing utility 202 is provided with a control 301 which designates a file path of an XPS document to be printed. Further, the UI screen 300 is provided with an output destination designating area 302, a print setting area 303, a department management setting area 309, a print button 312, and an end button 313. The print setting area 303 is provided with an output sheet size control 304, a layout control 305, a number of copies control 306, a two-sided print control 307, and a staple control 308. Further, the department management setting area 309 is provided with a department management ID control 310, and a password control 311.

A user who desires to print document data such as a XPS document enters (designates) a file path of the XPS document to be printed, in the control 301. Further, the user enters (designates) an output destination, a print setting and a department management setting, in the output destination designating area 302, the print setting area 303 and the department management setting area 309, respectively. Then, the user clicks the print button 312. The printer 150 designated as the output destination starts printing based on content designated in the print setting, the department management setting or the like.

Figure 4:
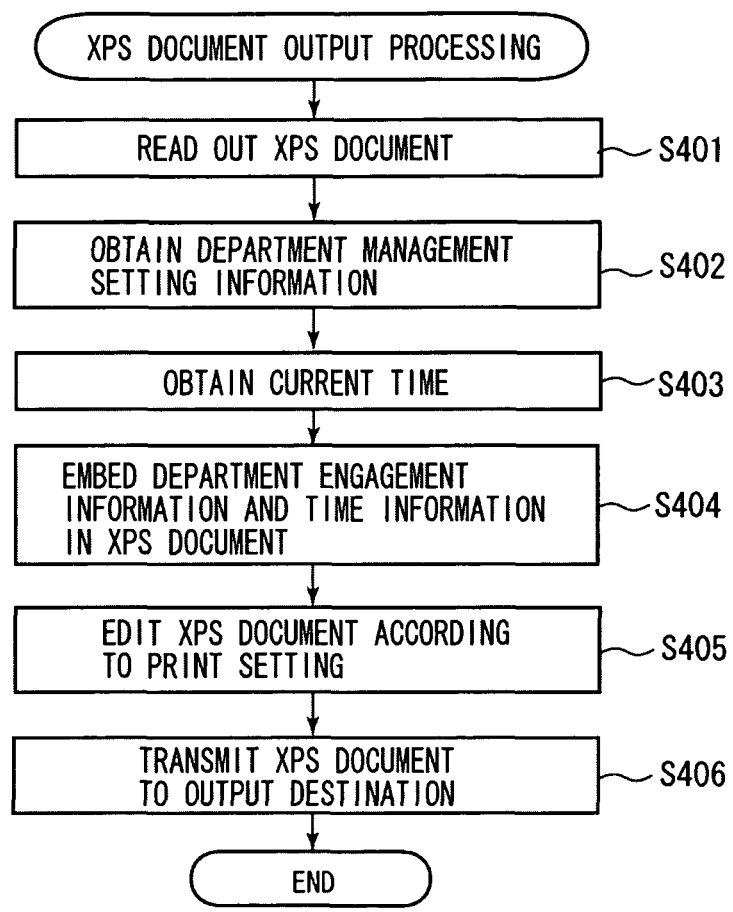
FIG. 4 is a flow chart illustrating an example of a printing processing executed by the printing utility according to the first exemplary embodiment of the present invention after a print button is clicked.

FIG. 4 is a flow chart illustrating an example of a print processing executed by the printing utility 202 after the print button 312 is clicked. A program of the printing utility 202 according to the flow chart of FIG. 4 is stored in the external memory (HD) 11 of the host computer 100 and is read out to the RAM 2 to be executed by the CPU 1.

When the user clicks the print button 312, in step S401, the XPS document reading unit 210 reads out the XPS document designated by the control 301 as illustrated in FIG. 3 from an input XPS document storing unit 207 and loads thus read out XPS document in the RAM 2. Then, in step S402, a department management information generation unit 203 obtains department management information designated by the department management setting area 309 as illustrated in FIG. 3 from the department management data storing unit 204. As described above, in the present exemplary embodiment, an example of the management information is realized with the department management information and the processing of step S402 realizes an example of the first obtaining unit of the printing control apparatus.

Subsequently, in step S403, a time information generation unit 205 obtains time information about a current time from a timer or the like which is built in the host computer 100. Thus, in the present exemplary embodiment, an example of the attribute information is realized with the time information and the processing of step S403 realizes one example of the second obtaining unit of the printing control apparatus.

Then, in step S404, the XPS document editing unit 206 stores the department management information obtained in step S402 and the time information obtained in step S403, in the XPD document having been loaded in the RAM 2.

Further, in step S404, the XPS document editing unit 206 also stores information specifying the printer 150 where the XPS document is used, in the department management information or the XPS document. More specifically, the XPS document editing unit 206 stores MAC address information representing a MAC address of the printer 150 which is an output destination designated to the output destination designating area 302 in FIG. 3, in the department management information or the XPS document. Thus, the MAC address information is embedded in the department management information or the XPS document, so that the printer 150 can discriminate a printer to which the department management information or the time information in the XPS document is to be directed. As described above, in the present exemplary embodiment, the processing of step S404 realizes the embedding unit of the printing control apparatus.

Figure 5:
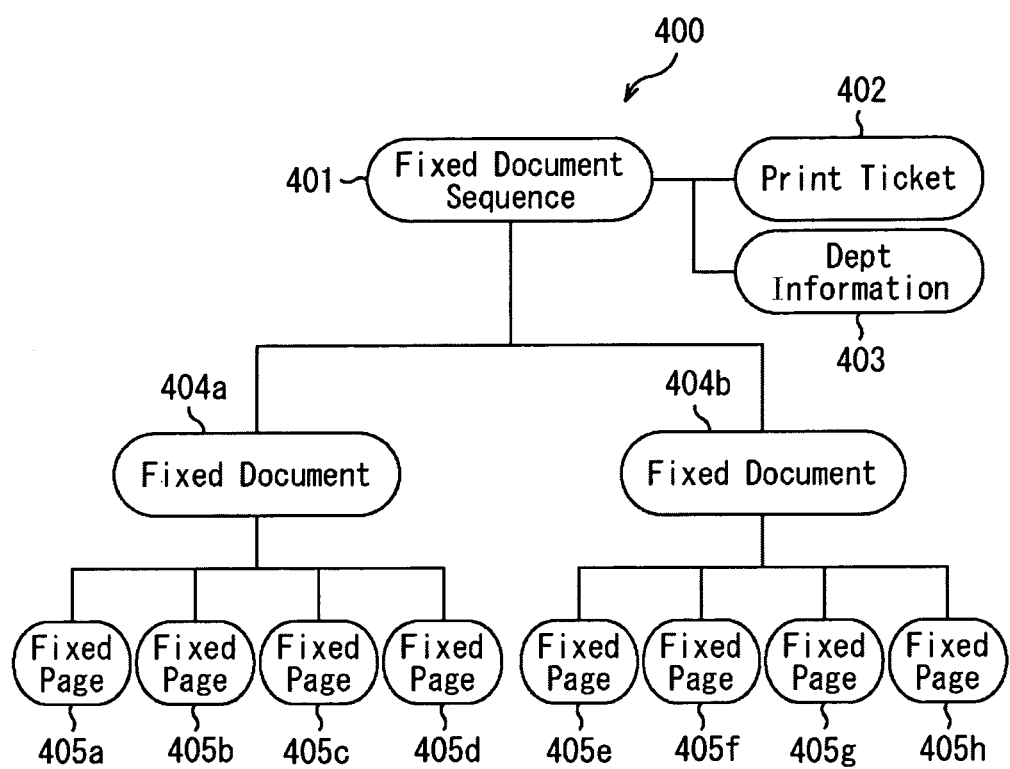
FIG. 5 is a view schematically illustrating an exemplary configuration of an XPS document in which department management information is embedded according to the first exemplary embodiment of the present invention.

FIG. 5 is a view schematically illustrating an exemplary configuration of the XPS document with the department management information embedded therein. In FIG. 5, only portions necessary for description in the present exemplary embodiment are illustrated from among portions composing an XPS document 400, and the other parts are omitted from the illustration.

A fixed document sequence 401 can be regarded as a job, a fixed document 404 as a document, and a fixed page 405 as a page. There is always only one fixed document sequence 401, which holds a plurality of fixed documents 404a and 404b. Further, the fixed document 404a holds a plurality of fixed pages 405a, 405b, 405c, and 405d. The fixed document 404b holds fixed pages 405e, 405f, 405g, and 405h. Still further, a print ticket can be related to each of the given fixed document sequence 401, the fixed document 404, and the fixed page 405. The print ticket stores a print setting. In FIG. 5, as an example, a print ticket 402 is related to the fixed document sequence 401. Further, the department information 403 is related to the fixed document sequence 401. The department information 403 stores the department management information.

FIG. 6 is a view illustrating an example of department management information stored in the XPS document 400 in step S404.

In FIG. 6, a lower hierarchy of a department account information tag 501 includes a department management ID tag 502, a password tag 503, and a department management generation time tag 504. The department management ID tag 502 and the password tag 503 include content of the department management setting area 309 of the UI screen 300 of FIG. 3. Further, time information obtained in step S603 is embedded in the department management generation time tag 504. The time information represents a time at which the department management information 500 (the department management ID tag 502 and the password tag 503) is generated. In FIG. 6, as an example, the department management information 500 is embedded in the form of plain text. However, the department management information may be encrypted by a specific ciphering method to prevent a third party from browsing the department management information 500.

Now, returning to the flow chart of FIG. 4, in step S405, the XPS document editing unit 206 edits the XPS document 400 loaded in the RAM 2 in accordance with a setting of the print setting area 303 as illustrated in FIG. 3. Since the UI screen 300, as an example, indicates a setting of a layout of <2 pages/sheet> in FIG. 3, the XPS document editing unit 206 makes a layout assigning page data corresponding to two pages of the XPS document 400 to a single sheet of physical paper. Further, the XPS document editing unit 206 stores the print settings to be processed by other printers, in the print ticket 402.

Then, in step S406, a XPS document transmission unit 208 outputs the XPS document 400 edited in step S605 to the output destination designated by the output destination designating area 302 as illustrated in FIG. 3. In the exemplary UI screen 300 of FIG. 3, since a file is selected as the output destination, the XPS document transmission unit 208 outputs the XPS document 400 in which attribute information such as the layout or the department management information is edited, to a designated file path. The XPS document transmission unit 208 stores the XPS document 400 in the output XPS document storing unit 209 according to a printing condition of the printer 150. The XPS document transmission unit 208, at a time when the XPS document 400 can be output, reads out the XPS document 400 from the output XPS document storing unit 209 and outputs the same.

Figure 7:
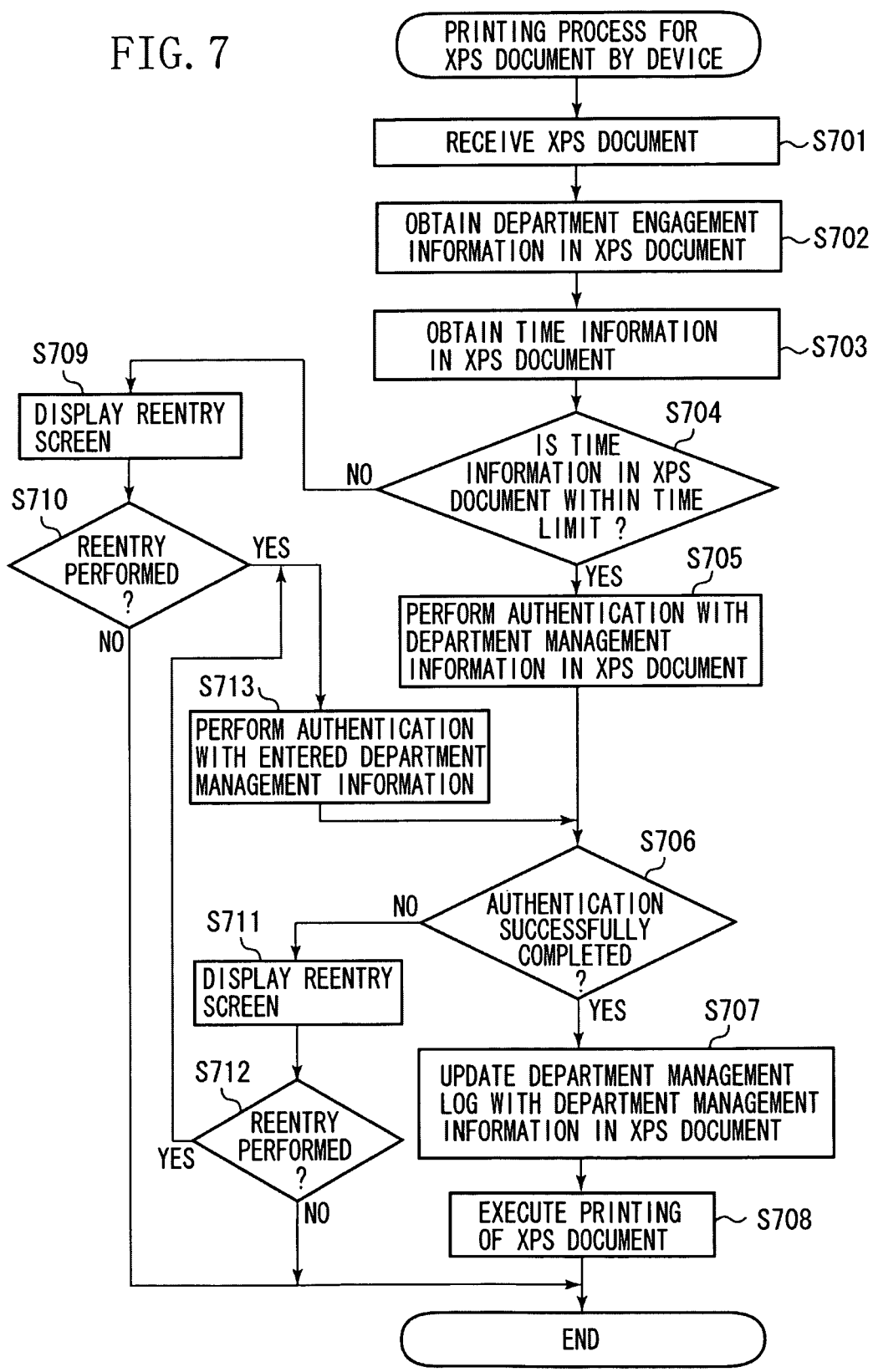
FIG. 7 is a flow chart illustrating an exemplary processing of a printer when a print job including the XPS document is output to a printer according to the first exemplary embodiment of the present invention.

Next, with reference to the flow chart of FIG. 7, a description is given as to exemplary processing of the printer 150 when a print job including the XPS document 400 is output to the printer 150. The program of the printer 150 according to the flow chart of FIG. 7 is stored in the external memory (HD) 21 to be read out to the RAM 13 and executed by the CPU 12.

In order to output the print job to the printer 150, the user designates a network with the output destination designating area 302 in FIG. 3 to select a port corresponding to the printer 150 to which the print job is output. In this state, if the print button 312 is clicked, in step S406 of FIG. 4, the XPS document transmission unit 208 transmits the XPS document 400 edited by the XPS document editing unit 206 to the printer 150 designated in the output destination designation area 302. Thus, in the present exemplary embodiment, the processing of step S406 realizes one example of the output unit of the printing control apparatus.

When the XPS document 400 is transmitted to the printer in a manner as described above, the print job receiving unit 212 of the printer 150 receives the XPS document 400 transmitted from the XPS document transmission unit 208 in step S701. As described above, in the present exemplary embodiment, for example, execution of the processing of step S701 realizes an example of the input unit of the printing apparatus.

Next, in step S702, an XPS document parsing unit 213 parses the XPS document 400 received in step S701 to obtain department management information 500 in the XPS document 400. Thus, in the present exemplary embodiment, the processing of step S702 realizes one example of the first obtaining unit of the printing apparatus. Subsequently, in step S703, the department management information authentication unit 214 obtains time information indicating a generation time of the department management information 500 from the department management information 500 obtained in step S702. As described above, the time information is embedded in the department management generation time tag 504. Thus, in the present exemplary embodiment, the processing of step S703 realizes one example of the second obtaining unit of the printing control apparatus.

Next, in step S704, a time information determination unit 215 obtains term information stored in a term information storing unit 217 and current time information stored in a time information storing unit 218. Then, the time information determination unit 215 determines whether the time information obtained in step S703 is within a time limit based on the above-mentioned information. Thus, in the present exemplary embodiment, the processing of step S704 realizes one example of the determination unit of the printing control apparatus.

Figure 8:
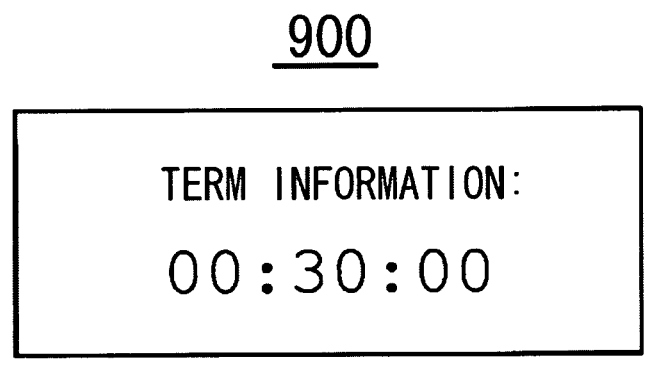

FIG. 8 is a view illustrating one example of term information stored in the term information storing unit 217. FIG. 9 is a view illustrating one example of the current time information stored in the time information storing unit 218. Exemplary term information 900 is 30 minutes in FIG. 8, and exemplary current time information 1000 is 9:50:3 of Jan. 19, 2007 in FIG. 9. Further, as is illustrated in FIG. 6, "time information indicating a time at which the department management information 500 is generated" obtained in step S703 is 9:44:22 of Jan. 19, 2007. In the examples of FIGS. 6, 8, and 9, the time information determination unit 215 determines that the time information obtained in step S703 is within a time limit since the current time is still within 30 minutes from the time information obtained in step S703.

Figure 10:
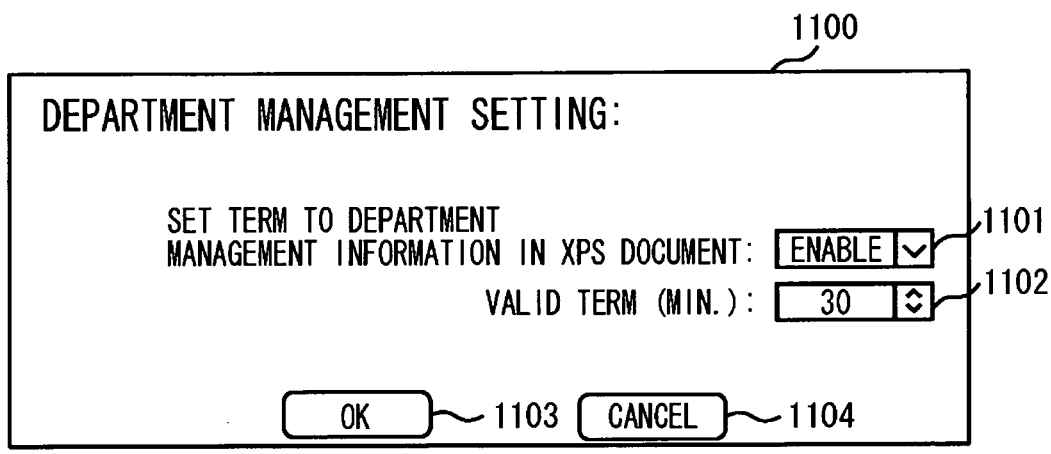
FIG. 10 is a view illustrating an example of a UI screen for setting the term information according to the first exemplary embodiment of the present invention.

FIG. 10 is a view illustrating an example of a UI screen for setting the term information 900. The UI screen 1100 of FIG. 10 is displayed on a display panel or the like of the operation unit 20 of the printer 150.

The user designates whether the term is to be set to the department management information 500 of the XPS document 400 by means of a control 1101. When the term is to be set to the department management information 500 of the XPS document 400, the user designates a valid term by minutes with a control 1102. The user clicks an OK button 1103 when the user is satisfied with the designations made with the controls 1101 and 1102. On the other hand, the user clicks a cancel button 1104 when the user cancels the designations made with the controls 1101 and 1102.

Making the determination is omitted in step S704 when invalidity is set in the control 1101. That is, it is determined in step S704 without condition that the time information obtained in step S703 is within the time limit.

As described above, in the present exemplary embodiment, the control 1102 of the UI screen 1100 of FIG. 10 realizes one example of the setting unit of the printing control apparatus, and the control 1101 realizes one example of the second setting unit of the printing control apparatus.

As described above, the processing goes to step S705 when it is determined in step S704 that the time information obtained in step S703 is within the time limit.

When the processing goes to step S705, the department management information authentication unit 214 performs authentication by comparing the department ID and the password of the XPS document 400 with authentication data stored in the department management information DB 219. The department ID and the password are entered into the department management ID control 310 and the password control 311 of FIG. 3, respectively, and are stored in the department management ID tag 502 and the password tag 503 of FIG. 6, respectively. Thus, in the present exemplary embodiment, the processing in step S705 realizes one example of the authentication unit of the printing control apparatus.

Then, in step S706, the department management information authentication unit 214 determines whether the authentication in step S705 was successful. If it is determined that the authentication was successful, the processing goes to step S707. When the processing goes to step S707, the department management log generation unit 220 updates count information of the department management log 221 by using the department ID of the XPS document 400. Subsequently, in step S708, the printing unit 222 prints out the XPS document 400 received in step S701 in accordance with a setting of the print ticket 402. Then, the processing according to the flow chart of FIG. 7 is ended. As described above, in the present exemplary embodiment, the processing in step S708 realizes one example of the print execution unit of the printing control apparatus.

On the other hand, if the authentication fails in step S706, the processing goes to step S711. When the processing goes to step S711, the expiration notifying unit 216 displays a reentry screen on an operation panel of the operation unit 20 to prompt the user to reenter the department ID and the password.

Figure 11:
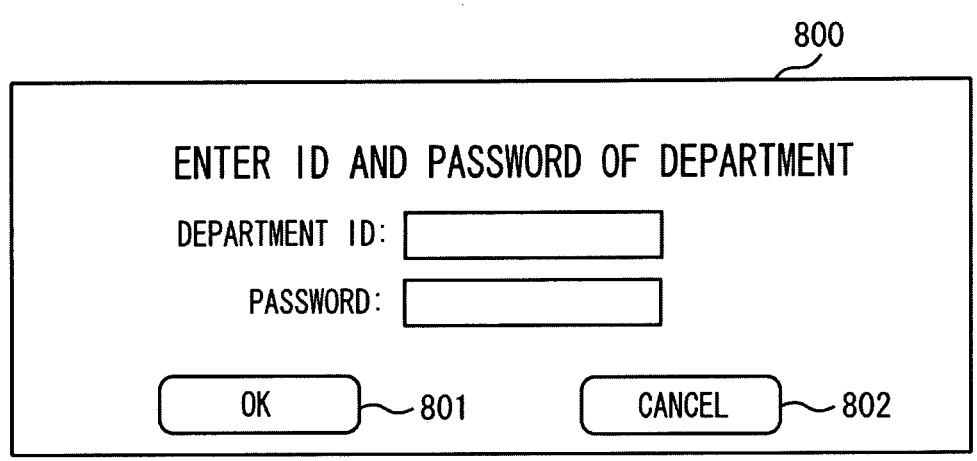
FIG. 11 is a view illustrating an example of a reentry screen according to the first exemplary embodiment of the present invention.

FIG. 11 is a view illustrating an exemplary reentry screen. The department ID and the password are reentered into the control of the reentry screen 800. Then, the user clicks an OK button 801 if the user is satisfied with the reentered contents. On the other hand, the user clicks a cancel button 802 if the user cancels the reentered contents.

Then, in step S712, the expiration notifying unit 216 determines whether the reentry was made on the reentry screen 800. If it is determined that the reentry was made, the step goes back to step S705. In step S705, the department management information authentication unit 214 performs an authentication by comparing the department ID and the password of the XPS document 400 with the reentered ones in step S711.

On the other hand, if the cancel button 802 was clicked and the expiration notifying unit 216 determined that the reentry was not made in step S712, the processing according to the flow chart of FIG. 7 is ended.

In the above-described step S704, if it is determined that the time information obtained in step S703 is not within the time limit (is outside of the time limit), the processing goes to step S709. When the processing goes to step S709, the expiration notifying unit 216 displays the reentry screen 800 as illustrated in FIG. 11 on the operation panel of the operation unit 20 to prompt the user to reenter the department ID and the password as the authentication information. Here, it can be displayed on the reentry screen 800 that the time information obtained in step S703 is outside of the time limit (i.e., the XPS document 400 is not available since the term after the generation of the department management information 500 expires). Thus, in the present exemplary embodiment, the processing in step S709 realizes one example of the display unit and the notifying unit of the printing control apparatus.

Then, in step S710, the expiration notifying unit 216 determines whether the reentry was made on the reentry screen 800. If it is determined that the reentry was made, the processing goes to step S713. In step S713, the department management information authentication unit 214 performs authentication by comparing the department ID and the password reentered in step S709 as the authentication information with authentication data stored in the department management information DB 219. Subsequently, the processing goes to the above-mentioned step S706.

On the other hand, if the cancel button 802 is clicked and it is determined that the reentry was not made in step S710, the processing according to the flow chart of FIG. 7 is ended.

As described above, in the present exemplary embodiment, the host computer 100 also embeds time information indicating a time at which the department management information 500 (the department management ID tag 502 and the password tag 503) was generated when the department management information 500 is embedded in the XPS document 400. Subsequently, the host computer 100 transmits the XPS document 400 to the printer 150. The printer 150 compares the time information embedded in the XPS document 400 with the current time. After making the comparison, the host computer 100 prints out the XPS document 400 in accordance with the setting of the print ticket 402 if a condition is satisfied that a lapsed time after the department management information 500 was generated is within a predetermined term. Therefore, the printer 150 can determine whether the department management information 500 is stored immediately before the start of the printing. Consequently, even in the case that the department management information 500 is stored in the XPS document 400, it is possible to prevent a third party who is not related to the department management information 500 from using the department management information 500 or from printing the XPS document 400 directly.

In the present exemplary embodiment, the time information is embedded in the department management information 500. However, the present invention is not limited to this exemplary embodiment. For example, the department management information 500 and the time information may be separately embedded in the XPS document 400. In this case, it is desirable that the department management information 500 and the time information are associated with each other. Further, the department management information 500 may be any information as long as it serves to manage the XPS document.

Further, in the present exemplary embodiment, the reentry screen 800 is displayed in the cases where the time information obtained in step S703 is outside of the time limit and where the authentication was not successful in step S705. However, the present invention is not limited to this exemplary embodiment. For example, it is also useful to end the processing according to the flow chart of FIG. 7 at least either when the time information obtained in step S703 is outside of the time limit or when the authentication in step S705 was not successful.

Now, a second exemplary embodiment of the present invention will be described below. In the above-described first exemplary embodiment, the time information indicating the time at which department management information 500 is generated is embedded in the XPS document and whether the XPS document is to be printed is determined based on the time information. However, in the present exemplary embodiment, whether the XPS document is to be printed is determined based on the device information such as a Media Access Control (MAC) address contained in the XPS document. The MAC address is a physical address inherent to hardware of a network device which is set in order to identify an individual node on a network. As described above, the present exemplary embodiment mainly differs from the above-described first exemplary embodiment in part of a method to determine whether the XPS document is to be printed. Therefore, in the description of the present exemplary embodiment, detailed descriptions are omitted as to the components identical to those of the above-described first exemplary embodiment. The same numbers in FIGS. 1 through 11 are applied to the identical components in the present exemplary embodiment.

In the present exemplary embodiment, the printer 150, for example, performs processing of obtaining MAC address information from the department management information obtained in step S702 instead of in step S703. As described above, in the present exemplary embodiment, one example of use destination information (attribute information) is realized according to the MAC address information.

Then, instead of step S704, the printer 150 determines whether the thus obtained MAC address information matches the MAC address of its own device. Then, the processing goes to step S705 if the MAC address information matches the MAC address of its own device. On the other hand, the processing goes to step S709 if the MAC address information does not match the MAC address of its own device.

As described above, also when the MAC address information is used, it is possible to prevent a third party from using the department management information or from printing the XPS document.

Furthermore, the above-described first and second exemplary embodiments may be combined. For example, the MAC address information may be obtained from the department management information after it is determined as Yes in step S704 of FIG. 7, and then it may be determined whether the thus obtained MAC address information matches the MAC address of the own device. If it is determined that the MAC address matches the MAC address information, the processing goes to step S705. On the other hand, the processing goes to step S709 if they do not match with each other. According to the above step, it becomes possible to more securely prevent a third party from using the department management information or from printing out the XPS document.

Each of the units composing the printing control apparatus and the printing apparatus and each of the steps of the printing control method in the above-described exemplary embodiments can be realized by executing a program stored in a RAM, a ROM, or the like of the computer. A program and a computer-readable storage medium which stores the program are included in the present invention.

Further, the present invention may include an embodiment, for example, in the form of a system, a device, a method, a program, a computer-readable storage medium, or the like. More specifically, the present invention is applicable to a system comprising a plurality of devices or a system made of a single device.

The present invention includes supplying the program of software which realizes the function of the above-described exemplary embodiments (the program corresponding to the flow chart of FIGS. 4 and 7 in the exemplary embodiments) to a system or a device directly or remotely. The present invention can also be applied to a case where a computer of the system or the device reads out and executes the supplied program code.

Therefore, a program code itself, which is installed in the computer in order to realize the functional processing of the exemplary embodiments of the present invention, also realizes the present invention. In other words, the present invention also encompasses the computer program itself which realizes the functional processing of the exemplary embodiments of the present invention.

In this case, any configuration may be available for the present invention as long as it has a function of the program, e.g., an object code, a program to be executed by an interpreter, script data to be supplied to an OS, or the like.

Examples of the computer-readable storage medium for supplying the program include a floppy disk, a hard disk, an optical disk, a magnet optical disk, a magneto optical disk (MO), a compact disc-ROM (CD-ROM), a CD-recordable (CD-R), a CD-rewritable (CD-RW), and the like. Further, examples of the computer-readable storage medium for supplying the program include an electromagnetic tape, a non-volatile memory card, a ROM, a digital versatile disk (DVD (DVD-ROM, DVD-R)), or the like.

In addition to the above, a method for supplying the program includes connecting the device to a website of the Internet through a browser of a client computer. Then, to supply the program, the computer program itself according to exemplary embodiments of the present invention or a compressed file containing an automatic installation function is downloaded from the website to a computer-readable storage medium such as a hard disk.

Further, the present invention can be realized when a program code composing the program of the exemplary embodiment of the present invention is divided into a plurality of files and the individual file is downloaded from different websites. More specifically, a WWW server which allows a plurality of users to download a program file which realizes the functional processing of the exemplary embodiments of the present invention using a computer is also included within the present invention.

It is also possible that the program of the present invention is encrypted and stored in a computer-readable storage medium such as a CD-ROM to supply the program. The computer-readable storage medium is distributed to users who satisfy a predetermined condition. The users are allowed to download key information for decoding the encrypted program from the website through the Internet, and such users execute the encrypted program by using the downloaded key information to install the program in the computer.

Further, execution of the program read out by the computer realizes functions of the above-described exemplary embodiments. In addition to the above, the functions of the above-described exemplary embodiments can be realized when an OS or the like working on a computer performs part or all of the actual processing based on an instruction of the program.

Still further, the program read out from the recording medium is written in a memory of an extension board inserted in a computer or an extension unit connected to a computer. Then, a CPU or the like provided in an extension board or an extension unit performs part or all of the actual processing based on an instruction of the program, which realizes the functions of the above-described exemplary embodiments.

According to the exemplary embodiments of the present invention, it becomes possible to determine if the management information may be used by the printing apparatus which prints document data. Therefore, a third party is prevented from using the document data in which the management information is embedded can be prevented as much as possible.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-040479 filed on Feb. 21, 2008, which is hereby incorporated by reference herein in its entirety.

What is claimed is:

1. A printing control apparatus comprising:
a memory; and
a processor comprising:
an authentication unit configured to perform authentication of document data wherein,
a generation time is embedded into the document data;
the generation time is a time at which a print command for printing the document data was created before the document data was sent to the printing control apparatus;
the authentication unit determines a time difference between the generation time and a current time;
in a first case in which the time difference is less than a time limit, the authentication unit sets an authentication flag as successful; and
in a second case in which the time difference is greater than the time limit, the authentication unit displays a screen for entering authentication information;
the authentication unit verifies that the authentication information entered in the displayed screen is associated with the document data;
in a third case in which the authentication information is associated with the document data, the authentication unit sets the authentication flag as successful; and
in a fourth case in which the authentication information is not associated with the document data, the authentication unit sets the authentication flag as unsuccessful; and
an execution unit configured to execute printing of the document data when the authentication flag is successful.

2. The printing control apparatus according to claim 1, wherein
the authentication unit performs the authentication based on information embedded into the document data and information being managed at the printing control apparatus.

3. A printing control method, comprising:
performing authentication of document data wherein, a generation time is embedded into the document data;

the generation time is a time at which a print command for printing the document data was created before the document data was sent to the printing control apparatus;

determining a time difference between the generation time and a current time;

in a first case in which the time difference is less than a time limit, set an authentication flag as successful; and in a second case in which the time difference is greater than the time limit, display a screen for entering authentication information;

verify that the authentication information entered in the screen is associated with the document data;

in a third case in which the authentication information is associated with the document data, set the authentication flag as successful; and in a fourth case in which the authentication information is not associated with the document data, set the authentication flag as unsuccessful; and executing printing of the document data when the authentication flag is successful.

4. The printing control method according to claim 3, wherein performing the authentication based on the information embedded into the document data and information being managed at an apparatus on which the printing is executed.

5. A computer-readable storage medium for storing a computer program which causes a computer to execute operations comprising:

performing authentication based on document data;

a generation time is embedded into the document data;

the generation time is a time at which a print command for printing the document data was created before the document data was sent to the printing control apparatus;

determining a time difference between the generation time and a current time;

in a first case in which the time difference is less than a time limit, set an authentication flag as successful; and in a second case in which the time difference is greater than the time limit, display a screen for entering authentication information;

verify that the authentication information entered in the screen is associated with the document data;

in a third case in which the authentication information is associated with the document data, set the authentication flag as successful; and in a fourth case in which the authentication information is not associated with the document data, set the authentication flag as unsuccessful; and executing printing of the document data when the authentication flag is successful.

6. The computer-readable storage medium according to claim 5, wherein performing the authentication based on the information embedded into the document data and information being managed at an apparatus on which the printing is executed.

\* \* \* \* \*